UNITED STATES PATENT OFFICE.

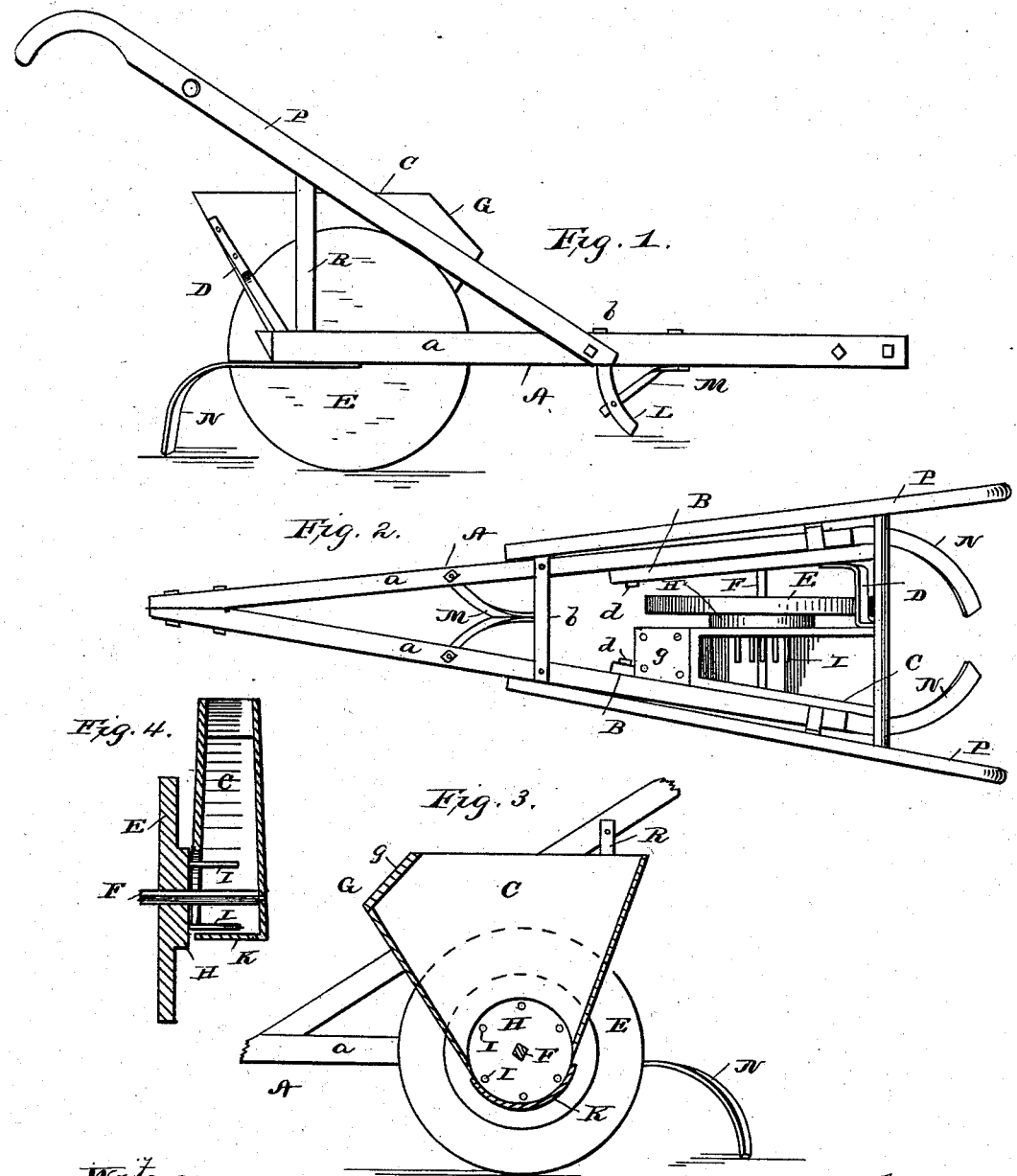

RHODON M. BROOKS AND JAMES M. BROOKS, OF JENKINSVILLE, GEORGIA.

COTTON-SEED PLANTER.

SPECIFICATION forming part of Letters Patent No. 255,585, dated March 28, 1882.

Application filed December 12, 1881. (No model.)

*To all whom it may concern:*

Be it known that we, RHODON M. BROOKS and JAMES M. BROOKS, of Jenkinsville, in the county of Pike, and in the State of Georgia, have invented certain new and useful Improvements in Cotton-Seed Planters; and we do hereby declare that the following is a full, clear, and exact description thereof, reference being had to the accompanying drawings, and to the letters of reference marked thereon, making a part of this specification.

This invention relates to certain improvements in cotton and other seed planters; and it has for its objects to provide for the automatic adjustment of the planter and its attachments to inequalities of the surface of the ground, and to prevent the seed from packing or arching in the hopper, as more fully hereinafter specified. These objects we attain by the apparatus and devices illustrated in the accompanying drawings, in which—

Figure 1 represents a side elevation of our improvement; Fig. 2, a top view thereof; Fig. 3, a vertical sectional view taken through the hopper, and Fig. 4 a transverse vertical sectional view through the hopper and distributing-wheel.

The letter A indicates the main frame of the apparatus, consisting of the two beams $a$, joined together at their front ends by means of bolts or otherwise, and diverging toward their rear ends, being braced about midway between their ends by means of a connecting-bar, $b$, Figs. 1 and 2.

The letter B indicates two arms, pivoted respectively to the beams $a$ on their inner sides at $d$.

C indicates the seed-hopper, which is connected at the bottom, on one side, directly to one of the arms B, at the rear thereof, and by means of a brace, D, to the other beam on the opposite side, the said brace being bent, as indicated, so as to clear the driving-wheel E. The said wheel is mounted on a transverse shaft, F, journaled in suitable bearings in the arms B, one end of said shaft passing transversely through the lower part of the hopper. The hopper has its front and rear sides inclined from the top toward each other to the bottom, as shown in Figs. 1 and 3 of the drawings. The forward side is gradually widened from the top to the bottom, rendering the forward part of the hopper narrower at the top than at the bottom, while the rear side is the same width throughout its length. The said rear side, however, is wider than the widest portion of the front side of the hopper, so that while it renders the rear portion of the hopper wider than the front the width of the rear part of the hopper will be uniform from top to bottom. The forward upper edges of the sides of the hopper are beveled, as indicated by the letter G, and have secured to them an inclined top piece, $g$, as indicated in Figs. 2 and 3 of the drawings.

The wheel E is provided on its side next the hopper with a boss, H, which sets closely against the side of the hopper. The said boss is provided with a circular series of distributing-pins, I, which extend into the lower part of the hopper, and are adapted to rotate therein. The letter K indicates a curved metallic plate, which forms the bottom of the hopper.

The letter L indicates a furrow-opener secured to the main frame forward of the seed-distributing devices, the said opener being braced to the frame by the forked brace-bar M. The rear ends of the beams $a$ have attached to them the curved coverers N.

P indicates the handles, which are secured directly to the beams $a$ at their forward ends, and which are braced to the frame by means of the vertical bars R, which are secured to said beams and handles in any suitable manner.

Having thus described our invention, what we claim, and desire to secure by Letters Patent, is—

The hopper constructed, substantially as described, with the forward end wider at the bottom than the top, the rear end wider than the forward end, but having a uniform width from top to bottom, in combination with V-shaped frame and the distributing mechanism, substantially as specified.

In testimony whereof we affix our signatures, in presence of two witnesses, this 17th day of November, 1881.

RHODON M. BROOKS.
J. M. BROOKS.

Witnesses:
MARY V. COCHRAN,
M. C. COCHRAN.